(12) United States Patent
Nenner et al.

(10) Patent No.: US 8,948,755 B2
(45) Date of Patent: Feb. 3, 2015

(54) METHOD, PUBLIC LAND MOBILE NETWORK, USER EQUIPMENT, AND PROGRAM

(75) Inventors: Karl Heinz Nenner, Bornheim (DE); Axel Klatt, Cologne (DE)

(73) Assignee: Deutsche Telekom AG, Bonn (DE)

( * ) Notice: Subject to any disclaimer, the term of this patent is extended or adjusted under 35 U.S.C. 154(b) by 52 days.

(21) Appl. No.: 13/816,242

(22) PCT Filed: Aug. 12, 2011

(86) PCT No.: PCT/EP2011/004065
§ 371 (c)(1),
(2), (4) Date: Feb. 11, 2013

(87) PCT Pub. No.: WO2012/019776
PCT Pub. Date: Feb. 16, 2012

(65) Prior Publication Data

US 2013/0143560 A1 Jun. 6, 2013

Related U.S. Application Data

(60) Provisional application No. 61/373,413, filed on Aug. 13, 2010, provisional application No. 61/377,530, filed on Aug. 27, 2010.

(30) Foreign Application Priority Data

Aug. 13, 2010 (EP) ..................................... 10008460
Aug. 27, 2010 (EP) ..................................... 10008940

(51) Int. Cl.
*H04W 4/00* (2009.01)
*H04W 60/00* (2009.01)
(Continued)

(52) U.S. Cl.
CPC ............ *H04W 60/005* (2013.01); *H04W 8/183* (2013.01); *H04W 8/22* (2013.01); *H04W 8/26* (2013.01); *H04W 48/18* (2013.01)
USPC ..................... 455/435.1; 455/435.3; 455/558; 455/557

(58) Field of Classification Search
CPC ... H04W 60/005; H04W 60/02; H04W 60/04; H04W 60/00; H04W 48/18; H04W 8/183; H04W 8/22; H04W 8/26

USPC ........ 455/435.1, 435.3, 558, 557, 550.1, 551, 455/552.1

See application file for complete search history.

(56) References Cited

U.S. PATENT DOCUMENTS 8,670,355 B1 * 3/2014 Frerking et al. .............. 370/271
2002/0176579 A1 11/2002 Deshpande et al.
(Continued)

FOREIGN PATENT DOCUMENTS

WO    WO 2008 025853 A2    3/2008

OTHER PUBLICATIONS

"Digital cellular telecommunications system (Phase 2+), Specification of the Subscriber Identity Module—Mobile Equipment (SIM-ME) interface (GSM 11.11 version 8.2.0 Release 1999)", 3GPP Standard; GSM 11.11, 3rd Generation Partnership Project (3GPP), Mobile Competence Centre; 650, Route Des Lucioles; F-06921 Sophia-Antipolis Cedex; France, No. V8.2.0, Apr. 1, 2000, pp. 1-160, XP050359878.

(Continued)

*Primary Examiner* — Khai M Nguyen
(74) *Attorney, Agent, or Firm* — Leydig, Voit & Mayer, Ltd.

(57) ABSTRACT

A method for providing public land mobile network access to a User Equipment. A first identity or communication context information relates to the use of the User Equipment according to a first mode of operation, the first mode of operation being defined at least partly by a first configuration information stored in the User Equipment and being associated to a first network access priority. A second identity or communication context information relates to the use of the User Equipment according to a second mode of operation, the second mode of operation being defined at least partly by a second configuration information stored in the User Equipment and being associated to a second network access priority. At least partly during the operation of the User Equipment, the network access of the User Equipment occurs simultaneously using the first mode of operation and using the second mode of operation.

7 Claims, 1 Drawing Sheet

(51) Int. Cl.
*H04W 8/18* (2009.01)
*H04W 8/22* (2009.01)
*H04W 8/26* (2009.01)
*H04W 48/18* (2009.01)

(56) References Cited

U.S. PATENT DOCUMENTS

| | | | |
|---|---|---|---|
| 2008/0182615 A1* | 7/2008 | Xue et al. | 455/552.1 |
| 2009/0296785 A1* | 12/2009 | Wu et al. | 375/132 |
| 2010/0120410 A1* | 5/2010 | Fan et al. | 455/419 |
| 2010/0125905 A1 | 5/2010 | Samuels | |
| 2013/0223369 A1* | 8/2013 | Nenner et al. | 370/329 |

OTHER PUBLICATIONS

"Digital cellular telecommunications system (Phase 2+); enhanced Multi-Level Precedence and Pre-emption service (eMLPP)—Stage (GSM 02.67 version 7.0.1 Release 1998)", 3GPP Standard; ETSI EN 300 924, $3^{rd}$ Generation Partnership Project (3GPP), Mobile Competence Centre; 650, Route Des Lucioles; F-06921 Sophia-Antipolis Cedex; France, No. V7.0.1, Jan. 1, 2000, pp. 1-15, XP050357598.

Latvakoski E J et al: "Application based access system selection concept for all IP mobile terminals", GLOBECOM'02. 2002—IEEE Global Telecommunications Conference. Conference Proceedings. Taipei, Taiwan, Nov. 17-21, 2002; [IEEE Global Telecommunications Conference], New York, NY: IEEE, US, vol. 3, Nov. 17, 2002, pp. 2984-2988, XP010636293, DOI: DOI:10.1109/GLOCOM.2002. 1189176 ISBN: 978-0-7803-7632-8.

* cited by examiner

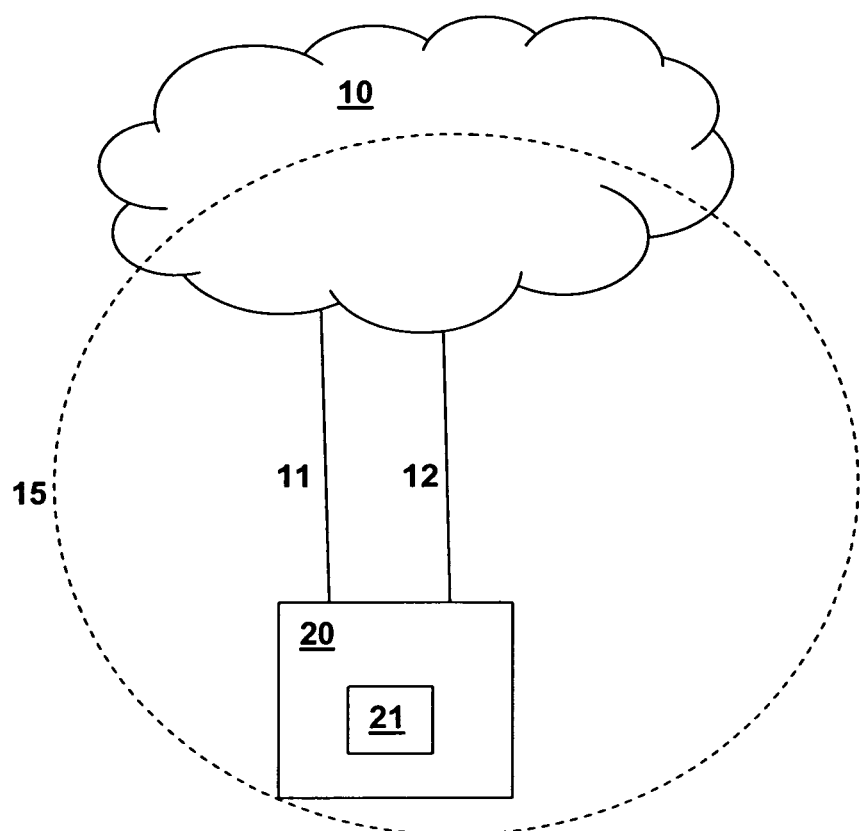

METHOD, PUBLIC LAND MOBILE NETWORK, USER EQUIPMENT, AND PROGRAM

CROSS-REFERENCE TO RELATED APPLICATIONS

This application is a U.S. National Phase application under 35 U.S.C. §371 of International Application No. PCT/EP2011/004065, filed on Aug. 12, 2011, and claims benefit to U.S. Provisional Application No. 61/373,413, filed Aug. 13, 2010, U.S. Provisional Application No. 61/337,530, filed Aug. 27, 2010, European Patent Application No. EP 10008460.7, filed Aug. 13, 2010, and European Patent Application No. EP 10008940.8, filed on Aug. 27, 2010. The International Application was published in English on Feb. 16, 2012 as WO 2012/019776 A1 under PCT Article 21(2).

FIELD

The present invention relates to a method, a public land mobile network and a User Equipment for providing network access to the User Equipment. According to the present invention, an efficient use of the hardware and software resources of both the User Equipment and the public land mobile network is possible.

BACKGROUND

In contemporary mobile networks, the hardware and software capabilities of the mobile terminals are characterized by the following aspects:
  The (hardware) capabilities of the mobile terminal, i.e. what the User Equipment can (physically) do. This is usually determined by the terminal's hardware and firmware. These properties of the mobile terminal further depend on the equivalent capabilities of the serving cell/serving network, e.g. when the User Equipment is HSPA (High Speed Packet Access) capable and the network only supports non-HSPA WCDMA (Wideband CDMA (Code Division Multiple Access)) R'99, or vice versa, then the lowest capability is the limiting factor (so even if the User Equipment is HSPA capable the network cannot use these capabilities). These capabilities are usually not easily changeable during normal operation without significant capability upgrades/exchanges; these are therefore called the "hard limits" of the mobile terminal
  Configuration and subscription parameters pertinent to the User Equipment—the latter usually by means of a subscriber identity module card (binding the User Equipment to a subscription OR customizing the User Equipment to a subscription)—i.e. what the User Equipment is allowed to do. These properties further depend on the configuration of the serving cell/serving network and the subscription parameters stored in the network, e.g. the HLR/HSS. Similar to the hard limits of the User Equipment, the lowest capability of these configuration and subscription parameters is the limiting factor in case of differences between the terminal and the network. These properties are usually changeable during normal operation by means of reconfiguration of the User Equipment and/or network, or by modifying the subscription and subscription parameters; these are therefore called the "soft limits" of the mobile terminal.
It is possible that the hard limits of the terminal (or User Equipment) are further restricted by the soft limits. E.g., the terminal and network may be capable of a certain maximal bandwidth on the radio interface, but the subscription only allows the User Equipment to use a lower maximum bandwidth.

Conversely, it is possible that the soft limits of the terminal are further restricted by the hard limits, e.g. the terminal is allowed to use a certain maximum bandwidth but the capability of the terminal or the serving cell/serving network are lower.

Consequently to the above, a terminal or User Equipment necessarily always operates within the intersection of its hard limits and its soft limits.

Given that the subscription aspects of the soft limits are applied to the terminal or User Equipment by a usually changeable subscriber identity module card, it is possible that identical terminals may have different soft limits, as determined by their respective SIM. It is also possible that the same terminal has different soft limits when the SIM card is changed. Furthermore, given that the configuration aspects of the soft limits can be modified (reconfigured), i.e. from a first configuration at a first point in time to a second configuration at a second point in time, the same terminal with the same subscriber identity module card can have different soft limits (at different points in time), depending on said configuration. Furthermore, as the terminal may operate in different cells/networks with different limitations and configurations, both the applicable hard and soft limits of the same terminal may be different between serving cells/serving networks.

According to the state of the art, User Equipments only have a single combination of hard limits and soft limits at one given point in time.

SUMMARY

In an embodiment, the present invention provides a method for providing network access to a User Equipment. The method includes: providing an access of the User Equipment to a public land mobile network. The User Equipment includes an identification information allowing the identification of a subscriber by the public land mobile network. A first identity or communication context information relates to the use of the User Equipment according to a first mode of operation, the first mode of operation being defined at least partly by a first configuration information stored in the User Equipment and being associated to a first network access priority. A second identity or communication context information relates to the use of the User Equipment according to a second mode of operation, the second mode of operation being defined at least partly by a second configuration information stored in the User Equipment and being associated to a second network access priority. The User Equipment comprises a subscriber identity module, wherein the subscriber identity module comprises the identification information. By accessing the public land mobile network using the first identity or communication context information and using the first network access priority, the first mode of operation is applied. By accessing the public land mobile network using the second identity or communication context information and using the second network access priority, the second mode of operation is applied. At least partly during the operation of the User Equipment, the network access of the User Equipment occurs simultaneously using the first mode of operation and using the second mode of operation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 schematically illustrates a cellular public land mobile network comprising at least one radio cell with a User Equipment.

DETAILED DESCRIPTION

Embodiments of the present invention provide a method as well as a public land mobile network and a User Equipment having an increased flexibility to be used in different situations.

In an embodiment, the present invention provides a method for providing network access to a User Equipment, wherein the network access comprises the access of the User Equipment to a public land mobile network, wherein the User Equipment comprises an identification information allowing the identification of the subscriber by the public land mobile network, wherein a first identity or communication context information relates to the use of the User Equipment according to a first mode of operation, the first mode of operation being defined at least partly by a first configuration information stored in the User Equipment and being associated to a first network access priority, and wherein a second identity or communication context information relates to the use of the User Equipment according to a second mode of operation, the second mode of operation being defined at least partly by a second configuration information stored in the User Equipment and being associated to a second network access priority, wherein the User Equipment comprises a subscriber identity module, wherein the subscriber identity module comprises the identification information, wherein by means of accessing the public land mobile network using the first identity or communication context information and using the first network access priority, the first mode of operation is applied, and wherein by means of accessing the public land mobile network using the second identity or communication context information and using the second network access priority, the second mode of operation is applied, wherein at least partly during the operation of the User Equipment, the network access of the User Equipment occurs simultaneously using the first mode of operation and using the second mode of operation.

In an embodiment, the present invention provides a method for providing network access to a User Equipment, wherein the network access comprises the access of the User Equipment to a public land mobile network, wherein the User Equipment comprises an identification information allowing the identification of the subscriber by the public land mobile network, wherein the identification information comprises a first identity information and a second identity information, wherein the first identity information relates to the use of the User Equipment according to a first mode of operation, the first mode of operation being defined at least partly by a first configuration information stored in the User Equipment, and wherein the second identity information relates to the use of the User Equipment according to a second mode of operation, the second mode of operation being defined at least partly by a second configuration information stored in the User Equipment, wherein the User Equipment comprises a subscriber identity module, wherein the subscriber identity module at least partly comprises the first identity information and the second identity information, wherein by means of accessing the public land mobile network using the first identity information, the first mode of operation is applied, and wherein by means of accessing the public land mobile network using the second identity information, the second mode of operation is applied, wherein at least partly during operation of the User Equipment, the network access of the User Equipment occurs simultaneously using the first mode of operation and using the second mode of operation.

According to the present invention, it is advantageously possible to provide the possibility that the User Equipment acts simultaneously with a plurality of different configuration and subscription parameters. In the context of the present invention such different configuration and subscription parameters are referred to as different modes of operation, i.e. a first mode of operation, a second mode of operation, a third mode of operation and so forth. As an alternative terminology, the different configuration and subscription parameters are also referred to as different "virtual terminals" (or "virtual User Equipments") or different "personalities" of the User Equipment, i.e. the User Equipment behaves potentially differently depending on the chosen mode of operation (or personality). The present invention provides methods wherein the personality of the terminal, as determined by the User Equipment's configuration and the subscription information available to the User Equipment (e.g. stored on the subscriber identity module card), can be handled more flexibly in comparison with the state of the art.

For example, it is necessary according to the prior art that Quality of Service (QoS) differentiation requires the use of different PDN connections (each having assigned a different Quality-of-Service profile that is usually the maximum allowed for that PDN connection) and/or the use of multiple bearers/PDP contexts on the same PDN connection and/or the application of policy control mechanisms within the network based on service data flows. This requires APN and/or bearer and/or Quality-of-Service awareness of the (software) applications (of the User Equipment). Equally, within the same Quality-of-Service profile in terms of the service flow parameters, applications might have different requirements pertaining to throughput, e.g. when using a narrow-band versus wide-band voice codec.

It is useful to assign a priority for the User Equipment in respect to accessing the network (particularly when there is high network load or congestion). According to the state of the art, an ordinary User Equipment for normal customers has a single priority, hence all applications are treated the same. However, in case that different communication contexts exist simultaneously with each having other specific characteristics, the application of a single value relating to different parameters such as priority, bandwidth or the like would not lead to an efficient use of the available (network and/or (radio) transmission) capacities or resources. E.g., in an in-vehicle communication context, a device is considered, which may be used for different communication contexts such as regularly transmitting maintenance information to the garage, sending near real-time traffic information to a traffic information center, be used for connection with multimedia services or calling for assistance in the event of a breakdown or an accident. Furthermore, that same device may be utilized for voice calls. Clearly, these applications should have different priorities, which is not possible simultaneously and using only one User Equipment according to the state of the art.

According to the present invention, the User Equipment or mobile terminal is able to communicate using a plurality of modes of operation (or personalities), i.e. at least two, namely a first mode of operation and a second mode of operation. Each of these modes of operation constitute a so-called "virtual terminal" or "virtual User Equipment" within the overall (soft and hard) limits of the (physical) User Equipment. According to the present invention, there is no limit to the number of virtual terminals (or different identities of modes of operation) per physical terminal (or physical User Equipment). This means that with a plurality of different (i.e. differentiable) virtual terminals (or virtual User Equipments), there might be two (or more) virtual terminals (or virtual User Equipments) that have an identical configuration (or soft limits) but are nevertheless differentiable, i.e. addressable (by means of, e.g., a virtual terminal identifier) either by a (software) application of the (physical) User Equipment or by the public land mobile network. When operating a plurality of virtual User Equipments simultaneously, the combined resource requirements of these virtual User Equipments are required to not exceed the hard and soft limits of the physical User Equipment.

According to the present invention, the User Equipment can be thought as comprising a first module, also called a mobile terminal and a second module, also called a terminal equipment. It is possible and preferred according to a variant of the present invention, that both the first and second module of the User Equipment are integrated in one housing and appearing to a user as one single integrated device. Likewise, it is also possible and preferred according to the present invention that the first and second module of the User Equipment are realized in two different housings or casings and that these modules are connected by a wireline communication link or a wireless communication link (such as Bluetooth, WLAN or according to another wireless communication standard.

According to the present invention, the different virtual User Equipments (or modes of operation of the (physical) User Equipment are identified by means of a plurality identities or communication contexts. According to the present invention, different communication contexts especially refer to different network access priorities. In the context of the present invention, a distinction between these different identities or different communication contexts is possible by means of using different indicators relating to these different identities or different communication contexts. These indicators are called identity or communication context information, i.e. the first mode of operation corresponds to the first identity information or first communication context information (hereinafter also called first identity or communication context information), the second mode of operation corresponds to the second identity information or second communication context information (hereinafter also called second identity or communication context information), and so forth. The (physical) User Equipment further comprises a subscriber identity module (usually an IP Multimedia Services Identity Module (ISIM) or a Universal Subscriber Identity Module (USIM) or a Global System of Mobile Communication (GSM) SIM card) and the (physical) User Equipment corresponds to or comprises an identification information (usually contained in the subscriber identity module). By means of a using the first identity or communication context information (which typically would comprise but does not necessarily comprise the identification information as well as an additional information identifying the first mode of operation) the (physical) User Equipment is able to access the public land mobile network using the first mode of operation (i.e. from the perspective of the public land mobile network, the first virtual terminal has requested network access using a first network access priority). By means of a using the second identity information (which typically would comprise but does not necessarily comprise the identification information as well as an additional information identifying the second mode of operation) the (physical) User Equipment is able to access the public land mobile network using the second mode of operation (i.e. from the perspective of the public land mobile network, the second virtual terminal has requested network access using a second network access priority). The first and second (and possibly further) identity information relates to, e.g., the subscription parameters (e.g. subscriber identity module card based), elements of the configuration of the (physical) User Equipment, elements of the configuration of the network. Subscriber identity module card parameters preferably can be changed using "over-the-air" mechanisms and terminal configuration parameters can be changed by any combination of local configuration or remote configuration (e.g. by a Non Access Stratum (NAS) communication, or an Access Stratum (AS) communication, or a mechanism involving a preferably external application server and in a transparent manner to the public land mobile network, or a message broadcast in the current cell of the User Equipment, or a user input via the user interface of the User Equipment, or a user input on a web site, especially a web site accessed via the User Equipment).

According to the present invention, it is preferred that the first mode of operation and the second mode of operation differ from each other with respect to at least one of:
the attachment of the User Equipment to the Packet Switched (PS) domain,
the attachment of the User Equipment to the Circuit Switched (CS) domain,
the allowed bandwidth of the connection between the User Equipment and the public land mobile network,
the Quality-of-Service of the connection between the User Equipment and the public land mobile network,
the destination of a requested access.

Thereby, it is advantageously possible to flexibly provide the possibility to differentiate between the modes of operation.

According to the present invention, it is furthermore preferred that the decision of using the first mode of operation or the second mode of operation is taken by an application software
of the User Equipment, or
controlling the User Equipment.

Thereby, it is advantageously possible that the application software (of the (physical) User Equipment or controlling the User Equipment) chose the mode of operation. To this end, it is preferred according to the present invention that the characteristics of the virtual terminals or virtual User Equipments are exposed to the software applications (e.g. of the (physical) User Equipment) so that the respective software application can choose the appropriate virtual User Equipment (or the appropriate mode of operation) according to the needs of that software application. Furthermore, it is preferred according to the present invention that the identifiers of the virtual terminals (or the identifiers of the modes of operation) (e.g. a letter (or letters) indicating the virtual terminal or a digit (or digits) indicating the virtual terminal or a combination of a letter (or letters) and a digit (or digits) indicating the virtual terminal or a name indicating the virtual terminal) are exposed to the software applications such that the respective software application can choose the appropriate virtual User Equipment (or the appropriate mode of operation) according to the needs of that software application without any consideration of the underlying characteristics. According to the present invention, it is further preferred that a (first) identifier (e.g. an external identifier, for example specified by a network operator) of a virtual terminal (or of a mode of operation) is resolved to another (second) identifier (e.g. an internal identifier within the physical User Equipment) of that same virtual terminal by the use of name resolution techniques, e.g. DNS (domain name system name resolution).

It is furthermore preferred according to the present invention that the decision of using the first mode of operation or the second mode of operation is taken by the public land mobile network.

According to the present invention, it is still furthermore preferred that the decision of using the first mode of operation or the second mode of operation is taken based on at least one of:
- the destination of a requested access (e.g. an access point name (APN), an Internet Protocol address, a called party number),
- the time of day (e.g. peak hours or off-peak hours),
- the day of the week (e.g. a working day or a weekend day, or a public holiday),
- the network load of the public land mobile network or of the network to be accessed,
- the current location of the User Equipment,
- whether or not the User Equipment is roaming,
- in case of roaming of the User Equipment the public land mobile network ID of the visited public land mobile network.,
- which is the actual human user of the User Equipment.

Thereby, an important degree of flexibility in the use of the different modes or operation can advantageously be achieved. According to the present invention, it is advantageously possible to overcome a drawback of the prior art, namely that it is presently not possible to differentiate the User Equipment's personality based on terminal location information, such as Cell ID, Location Area ID, Routing Area ID, PLMN ID, or geographic coordinates. This is of particular interest in respect to whether the terminal is located in a special service zone (e.g. "home zone"), within its Home Public Land Mobile Network (HPLMN), or within any, or a specific Visited Public Land Mobile Network (VPLMN). Likewise, it is advantageously possible according to the present invention compared to the prior art to differentiate the User Equipment's personality (or mode of operation) based on the destination of the communication beyond the granularity of an access point name (APN). According to one variant of a use scenario of a User Equipment according to the present invention, it is possible that more than one (e.g. human) user (i.e. at least two users) use the (physical) User Equipment, e.g. as an access means ("hot spot") to gain access to the internet. According to the present invention and according to such a variant, it is possible that these different users use a different virtual terminal of the User Equipment. In this embodiment it is possible (but not mandatory) that such at least two users have separate PIN numbers assigned and can gain access to the (physical) User Equipment's capabilities by means of using these PIN numbers. By means of the use of configuration information in the terminal and/or in the network, the proper virtual terminal can be assigned to the at least two different users.

A further drawback of the prior art that is overcome by the present invention refers to the barring of User Equipment (from accessing the public land mobile network resources): Presently terminals can be barred from accessing the network by a mechanism whereby either a bitmap is presented to the User Equipment which disallows a certain portion of the User Equipment population the access to a cell or the User Equipment draws a random number and compares this with a number obtained from the network; depending on the result of the comparison, the UE may or may not perform the access request; However, different granularity of barring or granting this network access is not possible according to the prior art. According to the present invention, such a different granularity is possible to achieve in a differentiated manner, e.g. differentiated by application, by time of day, or day of week, or the like.

Furthermore, it is advantageous that the availability of using the first mode of operation or the second mode of operation is defined by at least one out of:
- an absolute interval of time defined by a life time information related to the first mode of operation or related to the second mode of operation,
- an absolute date related to the first mode of operation or related to the second mode of operation,
- an interval of time defined by the usage time of the first mode of operation or of the second mode of operation,
- a data volume exchanged using the first mode of operation or using the second mode of operation,
- a number of connections established by the User Equipment using the first mode of operation or using the second mode of operation,
- a total number of transactions or a number of transactions per connection established by the User Equipment.

Thereby, it is advantageously possible that the choice of a mode of operation (or of a virtual terminal or virtual User Equipment) is performed on a case-by-case basis by, e.g., a software application of the (physical) User Equipment and that the lifetime or the existence of a binding between a (software) application of the (physical) User Equipment and a mode of operation can be flexibly defined.

According to a preferred embodiment of the present invention, an application software
- of the User Equipment, or
- controlling the User Equipment modifies the first configuration information or the second configuration information stored in the User Equipment.

Thereby, it is possible according to the present invention that certain requirements (or configuration parameters of a given virtual User Equipment) such as the application priority or the application Quality-of-Service preferences can be chosen by the software application (e.g. of the (physical) User Equipment), to further refine the way in which the virtual terminal (or mode of operation) accesses the public land mobile network and/or uses network resources, including the variant where an application feeds an "application priority" into the barring decision process (e.g. as a modifier of the random number drawn by the User Equipment) and/or in the selection process of the appropriate access priority applied by the User Equipment.

It is furthermore preferred according to the present invention that the first identity or communication context information and/or the second identity or communication context information and/or the first configuration information and/or second configuration information is transmitted between the public land mobile network and the User Equipment by means of:
- a Non Access Stratum (NAS) communication, or
- an Access Stratum (AS) communication, or a mechanism involving a preferably external application server and in a transparent manner to the public land mobile network, or a message broadcast in the current cell of the User Equipment.

Thereby, it is advantageously possible that an important flexibility is achieved with respect to the possibilities to configure the (physical) User Equipment and its different modes of operation.

According to the present invention, it is furthermore preferred that a change of the first identity or communication context information and/or the second identity or communication context information and/or the first configuration information and/or second configuration information is triggered by means of:

a Non Access Stratum (NAS) communication, or an Access Stratum (AS) communication, or a mechanism involving a preferably external application server and in a transparent manner to the public land mobile network, or a message broadcast in the current cell of the User Equipment, or a user input via the user interface of the User Equipment, or a user input on a web site, especially a web site accessed via the User Equipment.

Thereby, it is advantageously possible that also a user input can lead to a modification of the first identity or communication context information and/or the second identity or communication context information and/or the first configuration information and/or second configuration information.

According to the present invention, it is furthermore preferred that an appropriate security mechanism is applied such as to assure that only those applications that are permitted to do so can use a specific mode of operation of the (physical) User Equipment. For example, the virtual terminal (or mode of operation) could be protected with a security certificate and hence may only be used by those applications that can verify that they have the appropriate permission. Furthermore, it is possible and preferred according to the present invention that at least one of the modes of operation is not protected such that, e.g. certain calls or calls of a certain maximum duration or calls having a certain destination or non-roaming calls can be permitted without any permission requested. Furthermore, the life time of such a security information parameter can be limited in an analogous manner as the use of a certain virtual terminal (or the binding between a virtual terminal and a software). application).

In case that the permission to a requested virtual terminal is not granted due to security parameters, it is possible and preferred according to the present invention that an alternative virtual terminal (or a fallback or default virtual terminal (or mode of operation)) is chosen.

The present invention further relates to a public land mobile network, providing a network access to a User Equipment, wherein the User Equipment comprises an identification information allowing the identification of the subscriber by the public land mobile network, wherein a first identity or communication context information relates to the use of the User Equipment according to a first mode of operation, the first mode of operation being defined at least partly by a first configuration information stored in the User Equipment and being associated to a first network access priority, and wherein a second identity or communication context information relates to the use of the User Equipment according to a second mode of operation, the second mode of operation being defined at least partly by a second configuration information stored in the User Equipment and being associated to a second network access priority, wherein the User Equipment comprises a subscriber identity module, wherein the subscriber identity module comprises the identification information, wherein by means of accessing the public land mobile network using the first identity or communication context information and using the first network access priority, the first mode of operation is applied, and wherein by means of accessing the public land mobile network using the second identity or communication context information and using the second network access priority, the second mode of operation is applied, wherein at least partly during the operation of the User Equipment, the network access of the User Equipment occurs simultaneously using the first mode of operation and using the second mode of operation.

Additionally, the present invention further relates to a public land mobile network, providing a network access to a User Equipment, wherein the User Equipment comprises an identification information allowing the identification of the subscriber by the public land mobile network, wherein the identification information comprises a first identity information and a second identity information, wherein the first identity information relates to the use of the User Equipment according to a first mode of operation, the first mode of operation being defined at least partly by a first configuration information stored in the User Equipment, and wherein the second identity information relates to the use of the User Equipment according to a second mode of operation, the second mode of operation being defined at least partly by a second configuration information stored in the User Equipment, wherein the User Equipment comprises a subscriber identity module, wherein the subscriber identity module at least partly comprises the first identity information and the second identity information, wherein by means of accessing the public land mobile network using the first identity information, the first mode of operation is applied, and wherein by means of accessing the public land mobile network using the second identity information, the second mode of operation is applied, wherein at least partly during operation of the User Equipment, the network access of the User Equipment occurs simultaneously using the first mode of operation and using the second mode of operation.

The invention furthermore relates to a User Equipment providing network access to a public land mobile network, wherein the User Equipment comprises an identification information allowing the identification of the subscriber by the public land mobile network, wherein a first identity or communication context information relates to the use of the User Equipment according to a first mode of operation, the first mode of operation being defined at least partly by a first configuration information stored in the User Equipment and being associated to a first network access priority, and wherein a second identity or communication context information relates to the use of the User Equipment according to a second mode of operation, the second mode of operation being defined at least partly by a second configuration information stored in the User Equipment and being associated to a second network access priority, wherein the User Equipment comprises a subscriber identity module, wherein the subscriber identity module comprises the identification information, wherein by means of accessing the public land mobile network using the first identity or communication context information and using the first network access priority, the first mode of operation is applied, and wherein by means of accessing the public land mobile network using the second identity or communication context information and using the second network access priority, the second mode of operation is applied, wherein at least partly during the operation of the User Equipment, the network access of the User Equipment occurs simultaneously using the first mode of operation and using the second mode of operation.

Additionally, the invention furthermore relates to a User Equipment providing network access to a public land mobile network, wherein the User Equipment comprises an identification information allowing the identification of the subscriber by the public land mobile network, wherein the identification information comprises a first identity information and a second identity information,
- wherein the first identity information relates to the use of the User Equipment according to a first mode of operation, the first mode of operation being defined at least partly by a first configuration information stored in the User Equipment, and
- wherein the second identity information relates to the use of the User Equipment according to a second mode of operation, the second mode of operation being defined at least partly by a second configuration information stored in the User Equipment, wherein the User Equipment comprises a subscriber identity module, wherein the subscriber identity module at least partly comprises the first identity information and the second identity information, wherein by means of accessing the public land mobile network using the first identity information, the first mode of operation is applied, and wherein by means of accessing the public land mobile network using the second identity information, the second mode of operation is applied, wherein at least partly during operation of the User Equipment, the network access of the User Equipment occurs simultaneously using the first mode of operation and using the second mode of operation.

Such a public land mobile network and such a User Equipment have the advantage that the behaviour of User Equipments attached to the public land mobile network can be controlled in a more flexible manner, especially as regards different contexts of communication.

Additionally, the present invention relates to a program comprising a computer readable program code, which when executed on a computer executes the inventive method.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where a "first" and a "second" element or step or other entity are used, this includes also the use of more than two such elements or steps or other entities unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1, a cellular public land mobile network 10 is schematically represented. The public land mobile network 10 comprises a plurality of cells, one of which is represented by means of a dashed circle and designated by reference sign 15. The cell 15 also comprises a base station means (i.e. a fixed device such as an eNodeB or the like) having at least one antenna means such that radio coverage within the cell 15 is provided. For the sake of simplicity, the base station means is not depicted in FIG. 1. Within the coverage area of the cell 15, a User Equipment 20 is schematically illustrated. Usually, a cell 15 comprises a plurality of identical or different User Equipments such as the User Equipment 20. The User Equipment 20 comprises a subscriber identity module 21 and is able to be operated according to a first mode of operation and according to a second mode of operation. With respect to the first mode of operation, a first connection or communication link 11 is established or used between the User Equipment 20 and the public land mobile network 10, and with respect to the second mode of operation, a second connection or communication link 12 is established or used between the User Equipment 20 and the public land mobile network 10.

For example, the first mode of operation could correspond to the use of a User Equipment 20 for voice communication purposes. In this example, it might be the case that the User Equipment 20 is used within a vehicle and the second mode of operation might correspond to a connection to the public land mobile network 10 which is established in order to exchange vehicle data, e.g. regarding a technical problem of the vehicle to be fixed when the service is done to the vehicle.

According to another example, the first mode of operation could correspond to a multi user operation of the (physical) User Equipment, whereby the first mode of operation corresponds to the operation of the (physical) User Equipment by the first user, and wherein the second mode of operation corresponds to the operation of the (physical) User Equipment by the second user.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for providing network access to a User Equipment, the method comprising;
   providing the User Equipment with access to a public land mobile network;
   wherein the User Equipment comprises a subscriber identity module, the subscriber identity module comprising an identification information allowing the identification of a subscriber by the public land mobile network;
   wherein a first identity or communication context information relates to the use of the User Equipment according to a first mode of operation, the first mode of operation being defined at least partly by a first configuration information stored in the User Equipment and being associated to a first network access priority;

wherein a second identity or communication context information relates to the use of the User Equipment according to a second mode of operation, the second mode of operation being defined at least partly by a second configuration information stored in the User Equipment and being associated to a second network access priority;

wherein by accessing the public land mobile network using the first identity or communication context information and using the first network access priority, the first mode of operation is applied;

wherein by accessing the public land mobile network using the second identity or communication context information and using the second network access priority, the second mode of operation is applied;

wherein at least partly during the operation of the User Equipment, the network access of the User Equipment occurs simultaneously using the first mode of operation and using the second mode of operation, wherein the determination to use the first mode of operation and/or the second mode of operation is made by at least one of an application software of the User Equipment or an application software controlling the User Equipment;

wherein at least one of the application software of the User Equipment or the application software controlling the User Equipment modifies the first configuration information or the second configuration information stored in the User Equipment; and wherein:
at least one of the first identity or communication context information, the second identity or communication context information, the first configuration information, or second confirmation information is transmitted between the public land mobile network and the User Equipment by a Non Access Stratum (NAS) communication; and/or a change of at least one of the first identity or communication context information, the second identity or communication context information, the first configuration information, or the second configuration information is triggered by a NAS communication.

2. The method according to claim 1, wherein the first mode of operation and the second mode of operation differ from each other with respect to at least one of the following aspects:
attachment of the User Equipment to the Packet Switched (PS) domain;
attachment of the User Equipment to the Circuit Switched (CS) domain;
allowed bandwidth of the connection between the User Equipment and the public land mobile network;
Quality-of-Service of the connection between the User Equipment and the public land mobile network; and
destination of a requested access.

3. The method according to claim 1, wherein the decision of using the first mode of operation or the second mode of operation is taken based on at least one of:
destination of a requested access;
time of day;
day of the week;
network load of the public land mobile network or of the network to be accessed;
current location of the User Equipment;
whether or not the User Equipment is roaming;
in case of roaming of the User Equipment, the public land mobile network ID of the visited public land mobile network; or
identity of a human user of the User Equipment.

4. The method according to claim 1, wherein the availability of using the first mode of operation or the second mode of operation is defined by at least one out of:
an absolute interval of time defined by a life time information related to the first mode of operation or related to the second mode of operation;
an absolute date related to the first mode of operation or related to the second mode of operation;
an interval of time defined by the usage time of the first mode of operation or of the second mode of operation;
a data volume exchanged using the first mode of operation or using the second mode of operation;
a number of connections established by the User Equipment (20) using the first mode of operation or using the second mode of operation; or
a total number of transactions or a number of transactions per connection established by the User Equipment.

5. A public land mobile network, configured to provide a network access to a User Equipment;
wherein the User Equipment comprises a subscriber identity module, the subscriber identity module comprising an identification information allowing the identification of the subscriber by the public land mobile network;
wherein a first identity or communication context information relates to the use of the User Equipment according to a first mode of operation, the first mode of operation being defined at least partly by, a first configuration information stored in the User Equipment and being associated to a first network access priority;
wherein a second identity or communication context information relates to the use of the User Equipment according to a second mode of operation, the second mode of operation being defined at least partly by a second configuration information stored in the User Equipment and being associated to a second network access priority;
wherein by accessing the public land mobile network using the first identity or communication context information and using the first network access priority, the first mode of operation is applied;
wherein by accessing the public land mobile network using the second identity or communication context information and using the second network access priority, the second mode of operation is applied; and
wherein at least partly during the operation of User Equipment, the network access of the User Equipment occurs simultaneously using the first mode of operation and using the second mode of operation;
wherein the determination to use the first mode of operation and/or the second mode of operation is made by at least one of an application software of the User equipment or an application software controlling the User Equipment;
wherein at least one of the application software of the User Equipment or the application software controlling the User Equipment modifies the first configuration information or the second configuration information stored in the User equipment; and wherein:
at least one of the first identity or communication context information, the Second identity or communication context information, the first configuration information, or second configuration information is transmitted between the public land mobile network and the User Equipment by a Non Access Stratum (NAS) communication; and/or a change of at least one of the first identity or communication context information the second identity or communication context information the first configuration information, or the second configuration information is triggered by a NAS communication.

6. A User Equipment, configured to obtain network access to a public land mobile network, the User Equipment comprising:

a subscriber identity module, comprising an identification information allowing the identification of the subscriber by the public land mobile network;

wherein a first identity or communication context information relates to the use of the User Equipment according to a first mode of operation, the first mode of operation being defined at least partly by a first configuration information stored in the User Equipment and being associated to a first network access priority;

wherein a second identity or communication context information relates to the use of the User Equipment according to a second mode of operation, the second mode of operation being defined at least partly by a second configuration information stored in the User Equipment and being associated to a second network access priority;

wherein by accessing the public land mobile network using the first identity or communication context information and using the first network access priority, the first mode of operation is applied;

wherein by accessing the public land mobile network using the second identity or communication context information and using the second network access priority, the second mode of operation is applied; and wherein at least partly during the operation of the User Equipment, the network access of the User Equipment occurs simultaneously using the first mode of operation and using the second mode of operation;

wherein the determination to use the first mode of operation and/or the second mode of operation is made by at least one of an application software of the User Equipment or an application software controlling the User Equipment;

wherein at least one of the application software of the User Equipment or the application software controlling the User Equipment modifies the first configuration information or the second configuration information stored in the User Equipment; and wherein:

at least one of the first identity or communication context information, the second identity or communication context information, the first configuration information or second configuration information is transmitted between the public land mobile network and the User Equipment by a Non Access Stratum (NAS) communication; and/or a change of at least one of the first identity or communication context information, the second identity or communication context information, the first configuration information, or the second configuration information is triggered by a NAS communication.

7. A non-transitory computer-readable medium having computer-executable instructions stored thereon, the computer-executable instructions, when executed by a processor, causing a method for providing network access to user equipment the following steps to be performed, the method comprising:

providing the User Equipment with access to a public land mobile network;

wherein the User Equipment comprises a subscriber identity module, the subscriber identity module comprising an identification information allowing the identification of a subscriber by the public land mobile network;

wherein a first identity or communication context information relates to the use of the User Equipment according to a first mode of operation, the first mode of operation being defined at least partly by a first configuration information stored in the User Equipment and being associated to a first network access priority;

wherein a second identity or communication context information relates to the use of the User Equipment according to a second mode of operation, the second mode of operation being defined at least partly by a second configuration information stored in the User Equipment and being associated to a second network access priority;

wherein by accessing the public land mobile network using the first identity or communication context information and using the first network access priority, the first mode of operation is applied;

wherein by accessing the public land mobile network using the second identity or communication context information and using the second network access priority, the second mode of operation is applied; and wherein at least partly during the operation of the User Equipment, the network access of the User Equipment occurs simultaneously using the first mode of operation and using the second mode of operation;

wherein the determination to use the first mode of operation and/or the second mode of operation is made by at least one of an application software of the User Equipment or an application software controlling the User Equipment;

wherein at least one of the application software of the User Equipment or the application software controlling the User Equipment modifies the first configuration information or the second configuration information stored in the User Equipment; and wherein at least one of the first identity or communication context information, the second identity or communication context information, the first configuration information, or second configuration information is transmitted between the public land mobile network and the User Equipment by a Non Access Stratum (NAS) communication; and/or a change of at least one of the first identity or communication context information, the second identity or communication context information, the first configuration information, or the second configuration information is triggered by a NAS communication.

* * * * *